US008419288B2

(12) United States Patent
Kaneko et al.

(10) Patent No.: US 8,419,288 B2
(45) Date of Patent: Apr. 16, 2013

(54) HUB UNIT BEARING

(75) Inventors: Yoshio Kaneko, Fujisawa (JP); Eishi Shibuya, Fujisawa (JP); Masaru Hashida, Fujisawa (JP)

(73) Assignee: NSK Ltd., Tokyo (JP)

( * ) Notice: Subject to any disclaimer, the term of this patent is extended or adjusted under 35 U.S.C. 154(b) by 322 days.

(21) Appl. No.: 12/669,205

(22) PCT Filed: Jul. 14, 2008

(86) PCT No.: PCT/JP2008/062714
§ 371 (c)(1),
(2), (4) Date: Jan. 15, 2010

(87) PCT Pub. No.: WO2009/011340
PCT Pub. Date: Jan. 22, 2009

(65) Prior Publication Data
US 2010/0209031 A1    Aug. 19, 2010

(30) Foreign Application Priority Data
Jul. 17, 2007   (JP) ................. 2007-185980

(51) Int. Cl.
*F16C 33/76*   (2006.01)
*F16C 32/00*   (2006.01)
*F16C 13/00*   (2006.01)

(52) U.S. Cl.
USPC ............ 384/477; 384/448; 384/486; 384/544

(58) Field of Classification Search ................. 384/448, 384/477, 484, 486, 544, 589
See application file for complete search history.

(56) References Cited

U.S. PATENT DOCUMENTS

| | | | |
|---|---|---|---|
| 6,879,149 B2 * | 4/2005 | Okada et al. | 324/174 |
| 6,979,001 B2 * | 12/2005 | Ohtsuki et al. | 277/549 |
| 7,034,521 B2 * | 4/2006 | Sentoku et al. | 324/174 |
| 7,591,593 B2 * | 9/2009 | Tsujimoto | 384/486 |
| 2007/0003177 A1 * | 1/2007 | Yamamoto | 384/448 |
| 2007/0278851 A1 | 12/2007 | Nakamura et al. | |

FOREIGN PATENT DOCUMENTS

| | | |
|---|---|---|
| JP | 9-21822 A | 1/1997 |
| JP | 2001-301590 A | 10/2001 |
| JP | 2002-333033 A | 11/2002 |
| JP | 2004-205008 A | 7/2004 |
| JP | 2005-140320 A | 6/2005 |
| JP | 2005-299768 A | 10/2005 |
| JP | 2007-40388 A | 2/2007 |

OTHER PUBLICATIONS

International Search Report (PCT/ISA/210) for PCT/JP2008/062714, dated Aug. 5, 2008, 7 pages.
Written Opinion (PCT/ISA/237) for PCT/JP2008/062714, dated Aug. 5, 2008, 4 pages.
Office Action issued Apr. 19, 2012 by the Japanese Patent Office in counterpart Japanese Application No. 2007-185980.

* cited by examiner

*Primary Examiner* — Richard W Ridley
*Assistant Examiner* — Adam D Rogers
(74) *Attorney, Agent, or Firm* — Sughrue Mion, PLLC

(57) ABSTRACT

A hub unit bearing $H_1$ includes a rotational speed detector 9 which is made up of an encoder 6 and a sensor 8. A seal 5b on a side facing a center side of a vehicle includes a primary seal 5bp and a secondary seal 5bq which are disposed in that order in an axial direction from rolling elements 32 on a side facing the center side of the vehicle towards the center side of the vehicle so as to define a primary sealed space portion I between the vehicle's center side facing rolling elements 32 and the primary seal 5bp and a secondary sealed space portion II between the primary seal 5bp and the secondary seal 5bq, with the rotational speed detector 9 disposed within the secondary sealed space portion II.

3 Claims, 8 Drawing Sheets

HUB UNIT BEARING

TECHNICAL FIELD

The present invention relates to a hub unit bearing including a rotational speed detector.

BACKGROUND ART

Recently, there has been an increasing tendency that hub unit bearings for wheels include a rotational speed detector having installed therein an encoder made up of a multipolar magnet and an active sensor employing a Hall element or MR element in association with spread of ABS (Anti-lock Brake System).

As seen in JP-A-2002-333033, for example, there is an increasing number of multipolar magnets incorporating encorders which has a construction in which an encoder is fabricated integrally into a seal of a bearing so as to be installed in a hub unit bearing as a seal with an encoder.

However, in the case of a hub unit bearing for a driven wheel, since a constant velocity joint for driving the wheel exits on a center side of a vehicle while lying adjacent to a hub unit bearing, a problem is caused that there is no space for installation of a sensor. There is a proposal to deal with this problem (for example, refer to Patent Document 1).

Patent Document 1 will be studied by the use of terms and reference numbers which are used in the document. In Patent Document 1, an encoder 29 is mounted on an outer circumference of a constant velocity joint 3, and a sensor 35 is mounted on a stationary member 1 so as to face the encoder 29, whereby a detecting portion is provided. This detecting portion is made to open to the inside of a vehicle body through a gap between a radially inner surface of the stationary member 1 and a radially outer surface of the constant velocity joint 3 and is regarded as a portion from which muddy water or the like tends to intrude into the inside of the vehicle body. Therefore, the gap is sealed on the inside of the vehicle body. Namely, a construction in which a sealing mechanism is provided on a center side of the vehicle body is adopted.

Patent Document 1: JP-A-2001-301590

DISCLOSURE OF THE INVENTION

Problem That the Invention is to Solve

In the construction described in Patent Document 1, however, since suppliers of each components involved in the detecting portion are different, components from the different suppliers have to finally be assembled together on an assembly line of vehicles. As this occurs, since the detecting portion resides inwards of the stationary member 1, the control of a gap dimension between the encoder 29 and the sensor 35 becomes difficult, and since the construction only allows a rotational speed signal inspection to be carried out in an ensured fashion after assembling the components, completed rotational speed detectors have had a problem with assured reliability.

The invention has been made in view of these situations, and an object thereof is to provide a hub unit bearing which has a sealing durability against the intrusion of foreign matters into a rotational speed detector and which facilitates the control of a gap dimension between an encoder and a sensor in a detecting portion and enables a rotational speed signal inspection in the form of a hub unit bearing.

Means for Solving the Problem

With a view to attaining the object, according to an aspect of the invention, there is provided a hub unit bearing including:

an outer ring having a primary inner circumferential raceway on a side thereof which faces an outermost side of a vehicle and a secondary inner circumferential raceway on a side thereof which faces a center side of the vehicle;

an inner ring having on a side thereof which faces the outermost side of the vehicle a hub flange, from which a cylindrical portion extends towards the center side of the vehicle and having on the cylindrical portion a primary outer circumferential raceway and a secondary outer circumferential raceway which face the primary inner circumferential raceway and the secondary inner circumferential raceway, respectively;

rolling elements interposed between the primary inner circumferential raceway and the primary outer circumferential raceway on a side facing the outermost side of the vehicle;

rolling elements interposed between the secondary inner circumferential raceway and the secondary outer circumferential raceway on aside facing the center side of the vehicle;

a vehicle's outermost side facing seal provided on the side of the outer ring which faces the outermost side of the vehicle for sealing a space defined between the inner ring and the outer ring and a vehicle's center side seal provided on the side of the outer ring which faces the center side of the vehicle for sealing the space defined between the outer ring and the inner ring; and a rotational speed detector made up of an encoder mounted on the side of the inner ring which faces the center side of the vehicle and a sensor held in a sensor case mounted on the outer ring, wherein the vehicle's center side seal comprises a primary seal and a secondary seal which are disposed spaced apart from each other in an axial direction from the rolling elements on the side facing the center side of the vehicle towards the center side of the vehicle and has a primary sealed space portion between the rolling elements on the side facing the center side of the vehicle and the primary seal and a secondary sealed space portion between the primary seal and the secondary seal, and the rotational speed detector is disposed in the secondary sealed space.

According to the aspect of the invention, the primary seal comprises a metal insert fitted in the outer ring, a seal lip vulcanizedly bonded to the metal insert and a slinger fitted on the inner ring and having a flange which is bent radially outwards, and the rotational speed detector is formed by bringing the flange and the seal lip into sliding contact with each other to form a seal portion, mounting the encoder on an axially outward side surface of the flange and disposing the sensor so as to face the encoder.

In addition, according to another aspect of the invention, there is provided a hub unit bearing including:

an outer ring having a primary inner circumferential raceway on a side thereof which faces an outermost side of a vehicle and a secondary inner circumferential raceway on a side thereof which faces a center side of the vehicle;

an inner ring having on a side thereof which faces the outermost side of the vehicle a hub flange, from which a cylindrical portion extends towards the center side of the vehicle and having on the cylindrical portion a primary outer circumferential raceway and a secondary outer circumferential raceway which face the primary inner circumferential raceway and the secondary inner circumferential raceway, respectively;

rolling elements interposed between the primary inner circumferential raceway and the primary outer circumferential raceway on a side facing the outermost side of the vehicle;

rolling elements interposed between the secondary inner circumferential raceway and the secondary outer circumferential raceway on a side facing the center side of the vehicle;

a vehicle's outermost side facing seal provided on the side of the outer ring which faces the outermost side of the vehicle for sealing a space defined between the inner ring and the outer ring and a vehicle's center side seal provided on the side of the outer ring which faces the center side of the vehicle for sealing the space defined between the outer ring and the inner ring; and a rotational speed detector made up of an encoder mounted on the side of the inner ring which faces the center side of the vehicle and a sensor held in a sensor case mounted on the outer ring, wherein the vehicle's center side seal comprises a primary seal and a secondary seal which are disposed spaced apart from each other in an axial direction from the rolling elements on the side facing the center side of the vehicle towards the center side of the vehicle and has a primary sealed space portion between the rolling elements on the side facing the center side of the vehicle and the primary seal and a secondary sealed space portion between the primary seal and the secondary seal, and the rotational speed detector is formed by disposing the encoder and the sensor in the primary sealed space portion and in the secondary sealed space portion, respectively.

According to the aspect of the invention, the secondary seal is brought into sliding contact with the sensor case so as to form a seal portion.

Advantage of the Invention

According to the aspects of the invention, the hub unit bearing can be provided which has the sealing durability against the intrusion of foreign matters into the rotational speed detector and which facilitates the control of the gap dimension between the encoder and the sensor in the detecting portion and enables the rotational speed signal inspection in the form of the hub unit bearing.

Figure 1:
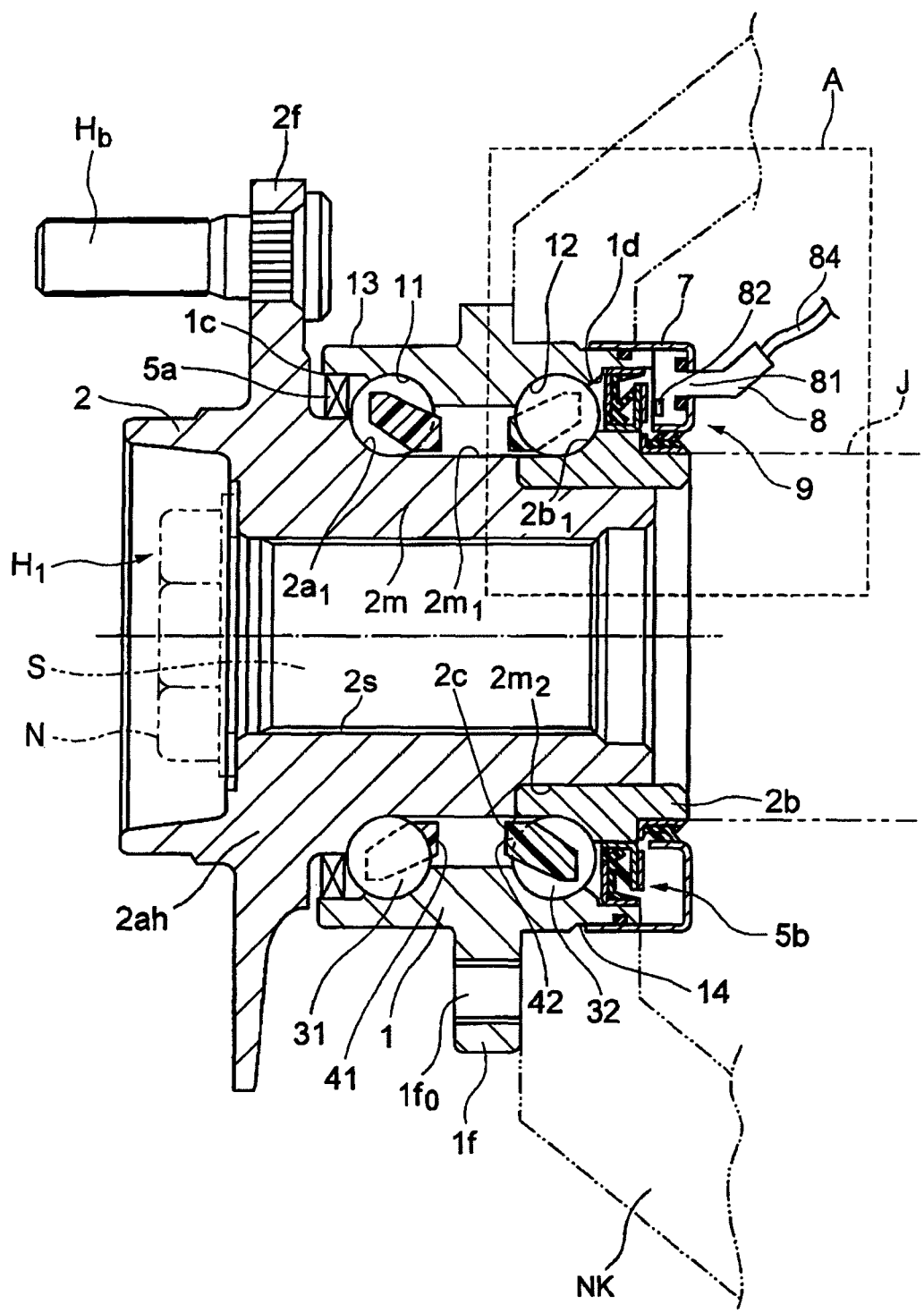
[FIG. 1] A sectional view showing Embodiment 1.

DESCRIPTION OF REFERENCE NUMERALS AND CHARACTERS $H_1$, $H_2$: hub unit bearing
1: outer ring
11, 12: inner circumferential raceway
13: outermost side facing outer ring end portion
14: center side facing outer ring end portion
$1f_0$: mounting flange
2: inner ring
2a, 2b: inner ring element
$2a_1$, $2b_1$: outer circumferential raceway
2ah: hub shaft
2c: stepped portion
2f: hub flange
2m: cylindrical portion
$2m_1$: outermost side facing cylindrical portion
$2m_2$: center side facing cylindrical portion
31, 32: ball
41, 42: cage
5a: outermost side facing seal
5b: center side facing seal
5bp: primary seal
5bq: secondary seal
6: encoder
7: sensor case
8: sensor
9: rotational speed detector
I: primary sealed space portion
II: secondary sealed space portion

BEST MODE FOR CARRYING OUT THE INVENTION

Hereinafter, an embodiment according to the invention will be described by reference to the drawings.

(Embodiment 1)

Figure 2:
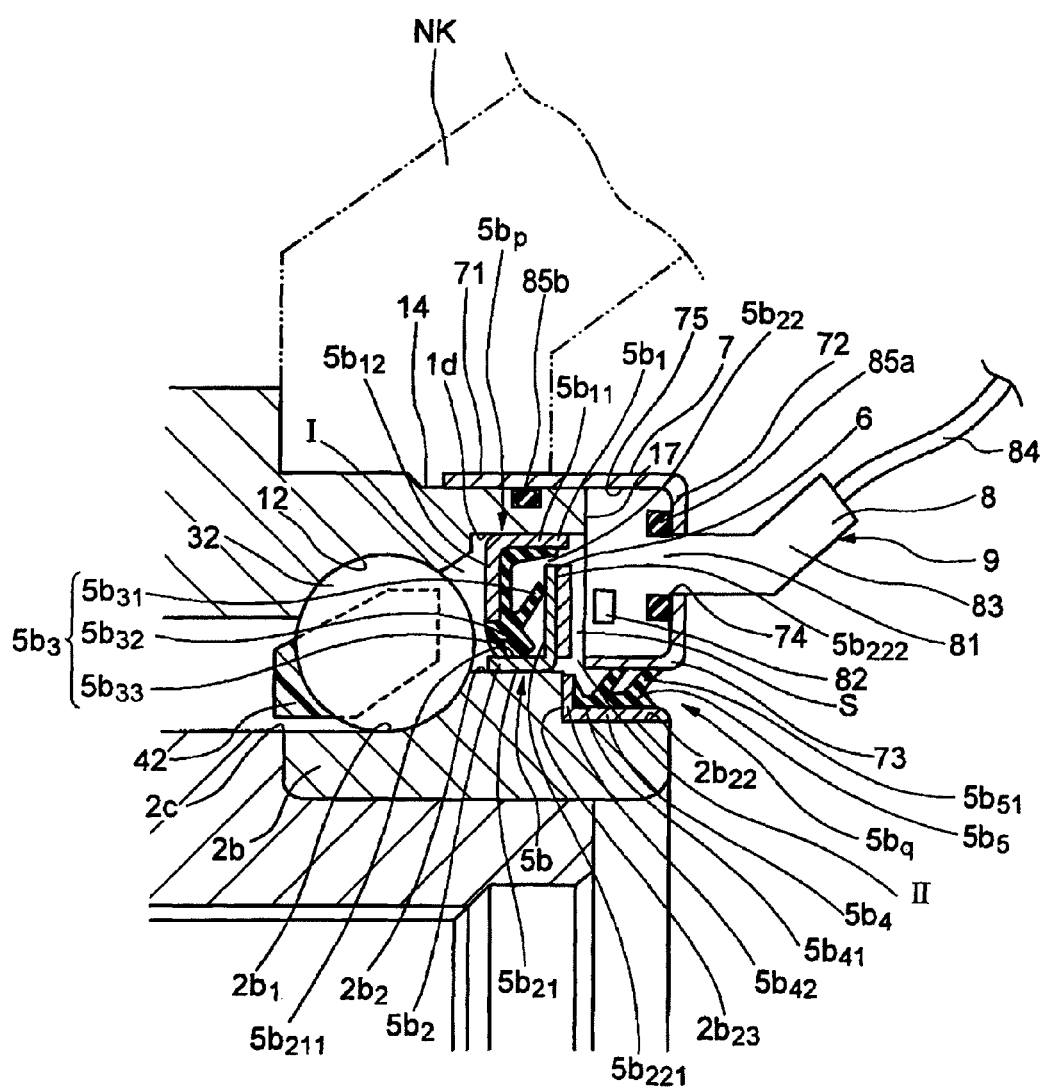
[FIG. 2] An enlarged view of a main part A of FIG. 1.

Embodiment 1 of the invention will be described by reference to FIGS. 1, 2. FIG. 1 is a sectional view showing Embodiment 1, and FIG. 2 is an enlarged view of a main portion of a part A in FIG. 1. In description of this embodiment, for the sake of simplification thereof, an outermost side of a vehicle will be referred to as an outermost side and a center side of the vehicle will be referred to as a center side.

This embodiment describes the invention as being applied to a hub unit bearing for a driven wheel of a vehicle. In a hub unit bearing $H_1$ of this embodiment, an outer ring 1 is a stationary ring, and an inner ring 2 is a rotating ring.

A hub unit bearing $H_1$ includes an outer ring 1 having a primary inner circumferential raceway 11 on an inner circumference of a side thereof facing an outermost side and a secondary inner circumferential raceway 12 on an inner circumference of a side thereof facing a center side, an inner ring 2 having on a side thereof facing the outermost side a road wheel mounting hub flange 2f, from which a cylindrical portion 2m extends towards the center side, the cylindrical portion 2m including towards the center side a primary cylindrical portion $2m_1$ and a secondary cylindrical portion $2m_2$ integrally formed with the primary cylindrical portion $2m_1$ and having an outer circumferential surface with a smaller diameter, and including a hub shaft 2ah in which a primary outer circumferential raceway $2a_1$ which faces the primary inner circumferential raceway 11 of the outer ring 1 is provided integrally on the primary cylindrical portion $2m_1$ and an inner ring element 2b having on an outer circumference thereof a secondary outer circumferential raceway $2b_1$ which faces the secondary inner circumferential raceway 12 of the outer ring, pluralities of balls 31, 32 as rolling elements on a side facing the outermost side which are interposed between the primary inner circumferential raceway 11 and the primary outer circumferential raceway $2a_1$ and rolling element on a side facing the center side which are interposed between the secondary inner circumferential raceway 12 and the secondary outer circumferential raceway $2b_1$, cages 41, 42 for retaining the balls 31, 32, an outermost side facing seal 5a and a center side facing seal $5b$ which are mounted on a side facing the outermost side and a side facing the center side of the outer ring 1, respectively, for sealing a bearing space between the outer ring 1 and the inner ring 2, and a rotational speed detector 9 provided at an end portion of the hub unit bearing $H_1$ which faces the center side.

In addition, the hub unit bearing $H_1$ is mounted on a vehicle body by the outer ring 1 being fixed to a knuckle NK which is part of the vehicle body.

Next, individual constituent components will be described.

As has been described before, the outer ring 1 has on its inner circumferential surface the double row inner circumferential raceway which is made up of the primary inner circumferential raceway 11 and the secondary inner circumferential raceway. The outer ring 1 has a mounting flange $1f$ at which the outer ring 1 is mounted on the vehicle body on an outer circumferential surface thereof. A predetermined number of bolt holes $1f_0$ are circumferentially provided in the mounting flange $1f$ for the outer ring 1 to be mounted on the knuckle NK.

The outer ring 1 has inner circumferential surfaces $1c$, $1d$ at an outermost side facing end portion 13 and a center side facing end portion 14 thereof, respectively. The outermost side facing seal $5a$ and the center side facing seal $5b$ are mounted on the inner circumferential surfaces $1c$, $1d$, respectively.

The inner ring 2 has the wheel mounting hub flange $2f$ on the side thereof which faces the outermost side, and the cylindrical portion $2m$ is formed to extend from the hub flange $2f$ towards the center side. The cylindrical portion $2m$ includes the primary cylindrical portion $2m_1$ and the secondary cylindrical portion $2m_2$. Thus, the inner ring 2 is made up of the hub shaft $2ah$ on which the primary outer circumferential raceway $2a_1$ which is formed integrally on the primary cylindrical portion $2m_1$ and the secondary cylindrical portion $2m_2$ which is provided to be continued from the primary cylindrical portion $2m_1$ via a stepped portion $2c$ and which has a smaller diameter are formed integrally in that order towards the center side and the inner ring element $2b$ which has the secondary outer circumferential raceway $2b_1$ on an outer circumferential surface thereof.

The primary outer circumferential raceway $2a_1$ faces the primary inner circumferential raceway 11 of the outer ring 1. The secondary outer circumferential raceway $2b_1$ faces the secondary inner circumferential raceway 12 of the outer ring 1.

A spline $2s$ is formed on an inner circumferential surface of the inner ring so as to be joined to a drive shaft S. In addition, a predetermined number of wheel mounting hub bolts Hb are attached to the wheel mounting hub flange $2f$. The drive shaft S is provided integrally with an outer joint member J of a constant velocity joint, and when the hub unit $H_1$ is assembled to the constant velocity joint, by tightening an outermost side facing end of the drive shaft S with a nut N, the inner ring element $2b$ is fixed to the hub shaft $2ah$.

The outermost side facing seal $5a$ is mounted on the inner circumferential surface $1c$ of the outermost side facing end portion 13 of the outer ring 1 so as to seal a space defined between the hub shaft $2ah$ and the outer ring 1, and no specific limitation is imposed on the shape thereof.

The center side facing seal $5b$ is mounted at the center side facing end portion 14 of the outer ring 1, so as to seal a space defined between the inner ring element $2b$ and the outer ring, or, more specifically, a space defined between the inner ring element $2b$ and the outer ring 1 and a sensor case 7 mounted on the outer ring 1, and the sensor case 7 will be described later. This will be described in detail later.

The balls 31 are the outermost side facing rolling elements which are interposed between the primary inner circumferential raceway 11 and the primary outer circumferential raceway $2a_1$ for supporting the outer and inner rings for relative rotation. The balls 32 are the center facing rolling elements which are interposed between the secondary inner circumferential raceway 12 and the secondary outer circumferential raceway $1b_1$ for supporting the outer and inner rings for relative rotation. The cages 41, 42 retain the balls 31, 32, respectively.

Next, the center side facing seal $5b$ and the rotational speed detector 9 will be described by reference to FIG. 2, as well.

The center side facing seal $5b$ includes a primary seal $5bp$ which is disposed adjacent to a center side facing side of the balls 32 which are the center side facing rolling elements and a secondary seal $5bq$ which is disposed closer to the center side than the primary seal $5bp$ and at a center side facing end portion of the bearing.

In an annular space defined between the inner ring element $2b$ and the outer ring 1 and the sensor case 7, the primary seal $5bp$ forms a primary sealed space portion I with the balls 32 and forms a secondary sealed space portion II with the secondary seal $5bq$.

Namely, in a sealed space defined by the outermost side facing and center side facing seals $5a$, $5b$ between the inner ring 2 and the outer ring 1, the primary sealed space portion I denotes a space defined between the center side facing balls 32 and the primary seal $5bp$ in the axial direction. In addition, in the annular space defined between the inner ring element $2b$ and the outer ring 1 and the sensor case 7, the secondary sealed space portion II is intended to denote a space partitioned by the primary seal $5bp$ and the secondary seal $5bq$.

The primary seal $5bp$ and the secondary seal $5pq$ will be described individually.

The primary seal $5bp$ is made up of a metal insert $5b_1$, a slinger $5b_2$ and a seal lip $5b_3$.

The metal insert $5b_1$ has a cylindrical portion $5b_{11}$ which is fitted in the inner circumferential surface $1d$ of the outer ring 1 and a flange portion $5b_{12}$ which is bent radially inwards from a predetermined position on the cylindrical portion $5b_{11}$ which lies axially inwards in the bearing.

The seal lip $5b_3$, which is an elastic element such as rubber, is vulcanized with an outer surface of the metal insert $5b_1$ which lies outwards of the bearing.

On the seal lip $5b_3$, an axial lip $5b_{31}$, a primary radial lip $5b_{32}$ and a secondary radial lip $5b_{33}$ are formed sequentially in that order from radially outside to inside thereof.

The slinger $5b_2$ has a cylindrical portion $5b_{21}$ which is fitted onto an outer circumferential surface $2b_2$ of the inner ring element $2b$ and a flange $5b_{22}$ which is bent radially outwards from a predetermined position on the cylindrical portion $5b_{21}$ which lies axially outwards.

The flange $5b_{22}$ has an inward side surface $5b_{221}$ which is oriented towards the bearing side and an outward side surface $5b_{222}$ which is oriented towards the outside of the bearing, and the inward side surface $5b_{221}$ is in sliding contact with the axial lip $5b_{31}$. An outer circumferential surface $5b_{211}$ of the cylindrical portion $5b_{21}$ is in sliding contact with the primary radial lip $5b_{32}$ and the secondary radial lip $5b_{33}$, so as to form a seal portion.

An encoder 6 is attached to the outward side surface $5b_{222}$ of the flange $5b_{22}$ by means of an adhesive method.

The encoder 6 is a magnetic encoder on which S poles and N poles are formed alternately in a circumferential direction thereof and takes the form or a ring having a predetermined thickness dimension in an axial direction thereof.

The secondary seal $5bq$ includes a metal insert $5b_4$ and an elastic member $5b_5$. The metal insert $5b_4$ has a cylindrical portion $5b_{41}$ which is fitted on to be fixed to an outer circumferential surface $2b_{22}$ with a reduced diameter of the inner ring element $2b$ and a flange portion $5b_{42}$ which is bent radially outwards from a predetermined position on the cylindrical portion $5b_{41}$ which lies on a side facing the outermost side.

The flange portion $5b_{42}$ is brought into abutment with a stepped portion $2b_{23}$ defined at an end of the reduced diameter outer circumferential surface $2b_{22}$ of the inner ring element $2b$. The elastic member $5b_5$ is vulcanizedly bonded to an outer circumference of the metal insert $5b_4$ and includes two seal lips $5b_{51}$, so as to form the secondary seal $5bq$ with the sensor case 7, which will be described later. In this embodiment, one or more than one seal lip $5b_{51}$ may be provided.

Next, the sensor case 7 will be described which holds a sensor 8, which will be described later.

The sensor case 7 is made up of a primary cylindrical portion 71 mounted on the outer ring 1, a bottom portion 72 bent radially inwards from a predetermined position on the primary cylindrical portion 71 which lies axially outwards, and a secondary cylindrical portion 73 bent in the same direction as the direction in which the primary cylindrical portion 71 is bent from a predetermined position on the bottom portion 72 which lies radially inwards.

The primary cylindrical portion 71, the secondary cylindrical portion 73 and the bottom portion 72 form an annular space portion 75. One opening 74 is formed in a predetermined position on the bottom portion 72.

Next, the sensor 8 will be described.

The sensor 8 is formed of a body 81, a detecting portion 82 which is incorporated in the body 81, a projection 83 for taking a wire out of the detecting portion 82, and lead wire 84.

The body 81 incorporates the detecting portion 82 and is brought into abutment with a center side facing end face 17 of the outer ring 1. The body 81 is accommodated in a predetermined portion in the annular space portion 75 of the sensor case 7.

The projection 83 is taken axially outwards out of the hole 74 which is formed in the predetermined portion, and the lead wire 84 taken out of the projection 83 is connected to an arithmetic operation circuit (whose illustration is omitted).

An O ring 85 is mounted at a joining portion between the projection 83 and the body 81 for preventing the intrusion of water from the hole 74 into the annular space portion 75.

In addition, an O ring 85 is also mounted between the primary cylindrical portion 71 and the outer ring 1 for preventing the penetration of water.

An inner circumferential surface of the secondary cylindrical portion 73 is brought into sliding contact with the seal lip $5b_{51}$ which is formed on the outer circumferential surface of the metal insert $5b_4$ which makes up part of the secondary seal $5bq$, which has been described before.

Thus, while the individual constituent components have been described heretofore, with the space defined between the center side facing rolling elements 32 and the primary seal $5bp$, which has been described before, referred to as the primary sealed space I and the space defined between the secondary seal $5bq$ and the primary seal $5bp$, which is described above, referred to as the secondary sealed space II, the magnetic encoder 6 mounted on the flange $5b_{22}$ of the slinger $5b_2$ and the detecting portion 82 of the sensor 8 incorporated in the body 81 accommodated in the sensor case 7 are made to face axially each other with a predetermined space s provided therebetween in the secondary sealed space portion II, whereby the rotational speed detector 9 is configured.

Note that the encoder 6 and the detecting portion 82 of the invention may be disposed to face each other radially.

Next, modified examples to the embodiment will be described below. The description of the portions and reference numerals that have been described in FIG. 2 will be omitted in the following description.

Figure 3:
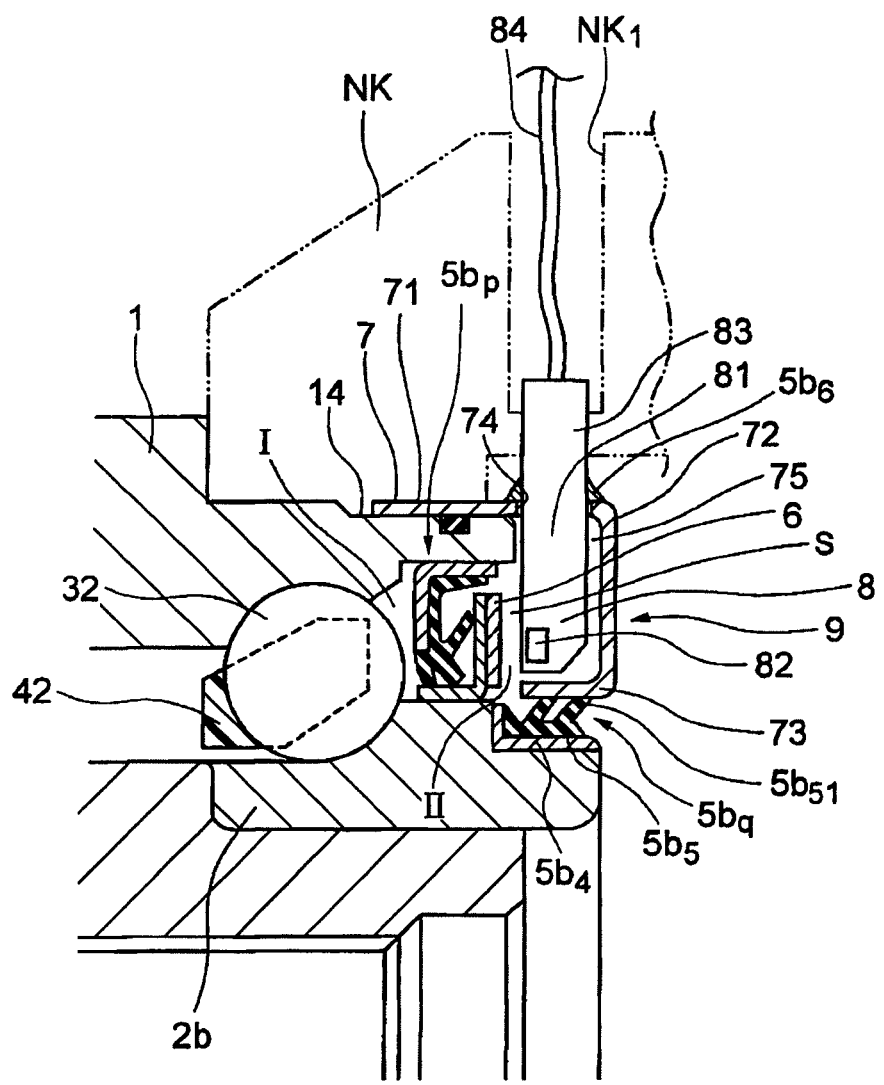
[FIG. 3] A diagram corresponding to FIG. 2, which shows Modified Example 1 of Embodiment 1.

Modified Example 1 of the embodiment will be described by reference to FIG. 3, which corresponds to FIG. 2.

A sensor 8 is mounted from a radially outward direction of a radial mounting hole $NK_1$ which is opened in a knuckle. The sensor 8 is made up of a detecting portion 82, a body 81 which incorporates the detecting portion 82, the projection 83 and a lead wire 84. A hole 74 is formed in a primary cylindrical portion 71 of a sensor case 7. The body 81 is inserted into an annular space portion 75 in the sensor case 7 from the outside in a radial direction through the hole 74 provided in the primary cylindrical portion 71 of the sensor case 7 for accommodation therein. A seal lip $5b_6$ is vulcanizedly bonded with an outer circumferential surface side of the primary cylindrical portion 71 for contact with the body 81 so as to prevent the penetration of foreign matters such as water into the annular space portion 75 of the sensor case 7. An encoder 6, which is mounted on a flange $5b_{22}$ of a slinger $5b_2$ of a primary seal $5bp$, and the detecting portion 82 are disposed so as to face each other with a predetermined space s provided therebetween.

In this modified example, as well, the encoder 6 and the detecting portion 82 are disposed in a secondary sealed space portion II, so as to configure a rotational speed detector 9.

Figure 4:
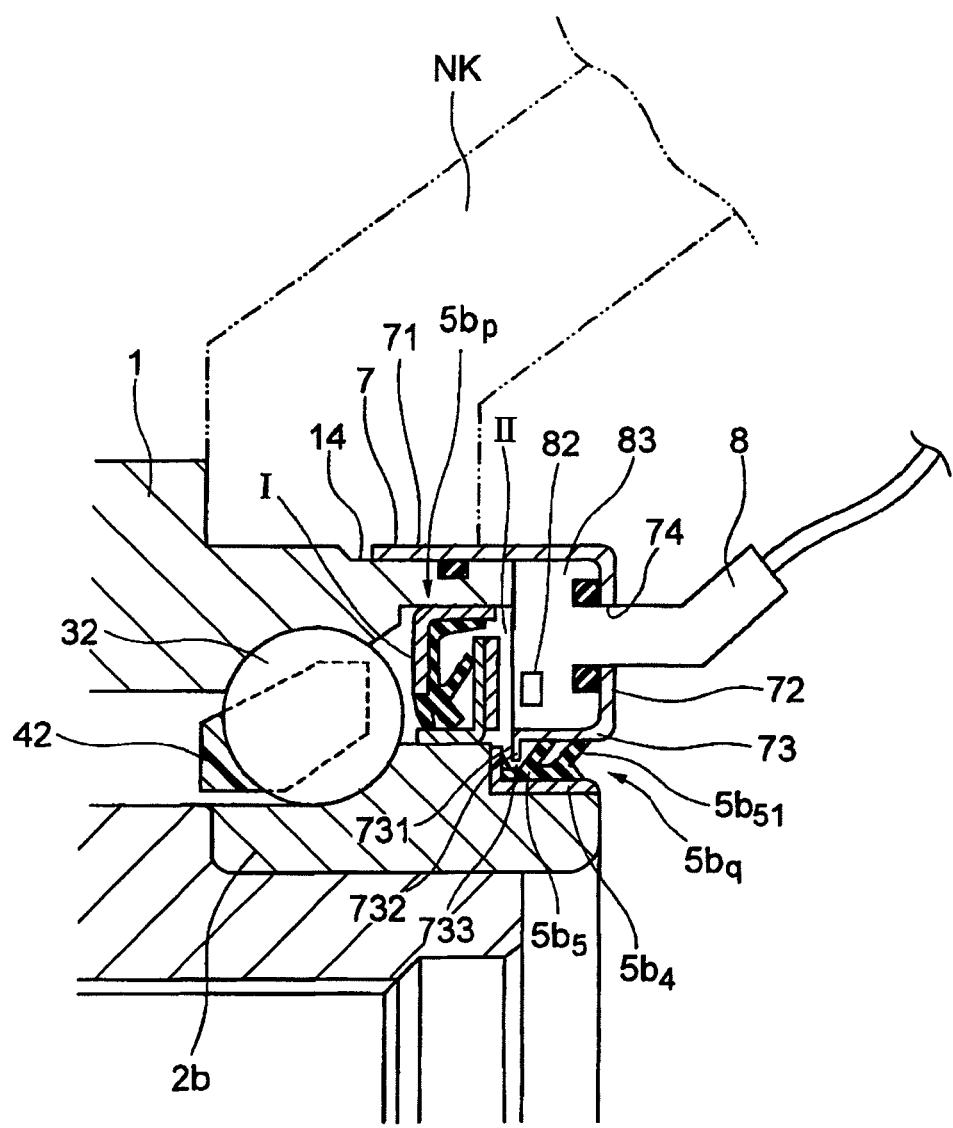
[FIG. 4] A diagram corresponding to FIG. 2, which shows Modified Example 2 of Embodiment 1.

Next, Modified Example 2 will be described by reference to FIG. 4, which corresponds to FIG. 2. Different features from what has been described in FIG. 2 will be described, and the description of features like to those that have already been described in FIG. 2 will be omitted here.

A secondary cylindrical portion 73 of a sensor case 7 has a flange portion 732 which is bent radially inwards at an axial end portion 731 thereof.

A radial rigidity of the secondary cylindrical portion 73 is increased by provision of the flange portion 732, which facilitates the control of dimensions. In addition, since a labyrinth 733 can be formed further inwards in the bearing than a seal lip $5b_{51}$ of a secondary seal $5bq$, the sealing function of the secondary seal $5bq$ can be reinforced thereby.

In this embodiment, as well, an encoder 6 and a detecting portion 82 are disposed in a secondary sealed space portion II, so as to configure a rotational speed detector 9.

Figure 5:
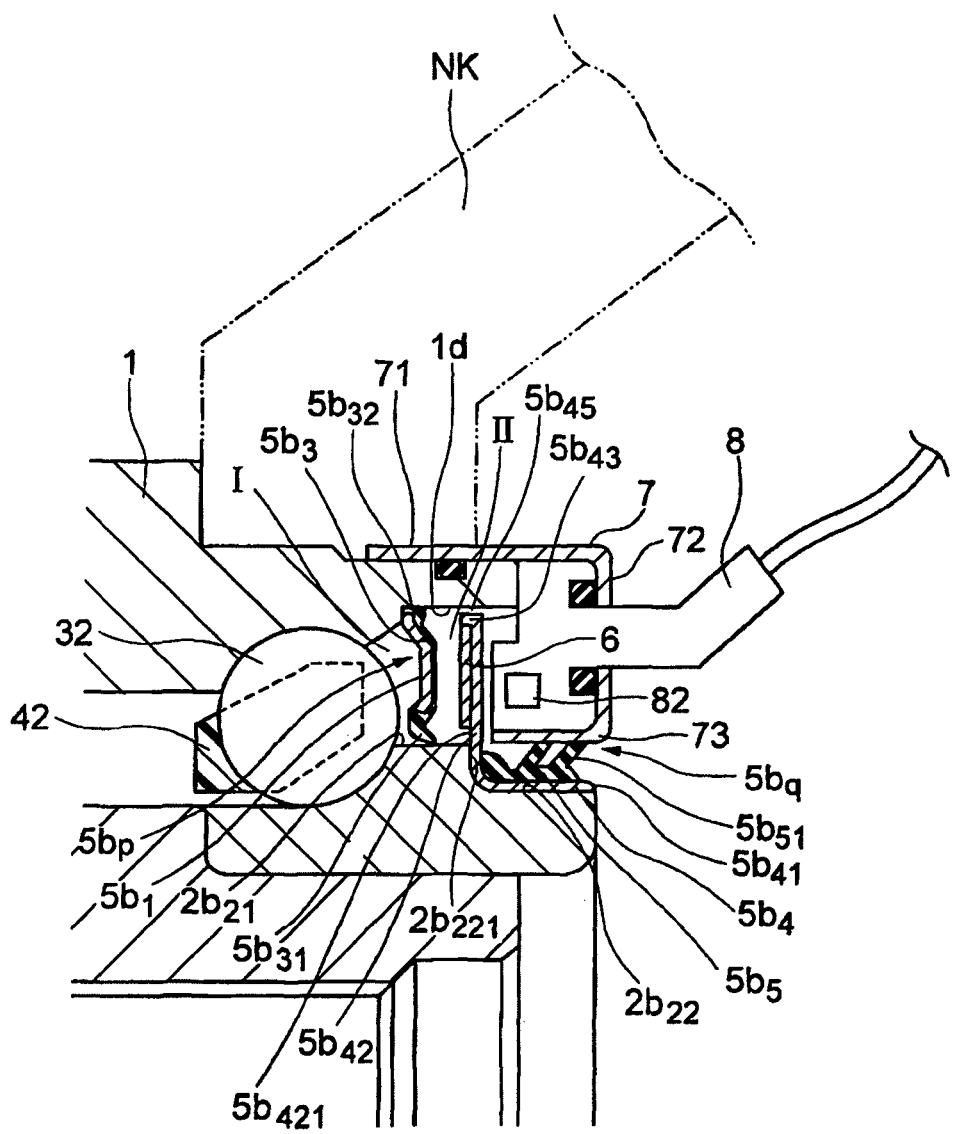
[FIG. 5] A diagram corresponding to FIG. 2, which shows Modified Example 3 of Embodiment 1.

Next, Modified Example 3 will be described by reference to FIG. 5, which corresponds to FIG. 2.

In this modified example, a primary seal $5bp$ is made up of a metal insert $5b_1$ and an elastic member $5b_3$ such as rubber which covers an axially outward side surface of the metal insert $5b_1$.

In the elastic member $5b_3$, an outer circumferential portion $5b_{32}$ is made to act as a mounting portion where the elastic member $5b_3$ is mounted on an inner circumferential surface $1d$ of an outer ring 1 and an inner circumferential portion is made to act as a seal lip $5b_{31}$ which is brought into sliding contact with an outer circumferential surface $2b_{21}$ of an inner ring element $2b$. A primary sealed space portion I is formed between a primary seal $5bp$ and center side facing rolling elements 32.

A secondary seal $5bq$ includes a metal insert $5b_4$ and an elastic member $5b_5$.

The metal insert $5b_4$ has a cylindrical portion $5b_{41}$ which is fitted on to be fixed to an outer circumferential surface $5b_{22}$ with a reduced diameter of the inner ring element $2b$ and a flange $5b_{42}$ which is bent radially outwards from a predetermined position on a cylindrical portion $5b_{41}$ which lies axially inwards in the bearing, and an outer circumferential portion of the flange $5b_{42}$ is bent axially inwards so as to form a cylindrical portion $5b_{43}$. Then, when the metal insert $5b_4$ configured in the way described above is mounted, a labyrinth $5b_{45}$ is formed between the cylindrical portion $5b_{43}$ and an inner circumferential surface ld of an outer ring 1. An encoder 6 is mounted on an axially inward side surface $5b_{421}$ of the flange $5b_{42}$.

The elastic member $5b_5$ is vulcanizedly bonded with an outer circumferential surface of the cylindrical portion $5b41$ and has two seal lips $5b_{51}$ on an outer circumference thereof, which are brought into sliding contact with an inner circumferential surface of a secondary cylindrical portion 73 of a sensor case 7, so as to form a secondary seal $5bq$.

Note that one or more than one seal lip $5b_{51}$ may also be used in this modified example.

In this modified example, a detecting portion 82 is provided in a secondary sealed space portion II and the encoder 6 is provided on the inward side surface $5b_{421}$ of the flange $5b_{42}$ via the flange $5b_{42}$.

The encoder 6 is mounted on the inward side surface $5b_{421}$ of the flange $5b_{42}$ and the function of the secondary seal $5bq$ is complemented by the labyrinth $5b_{45}$ formed between the cylindrical portion $5b_{43}$ and the inner circumferential surface 1d of the outer ring 1, so that even in case foreign matters should pass through the secondary seal $5bq$, the encoder 6 can be prevented from being damaged.

Figure 6:
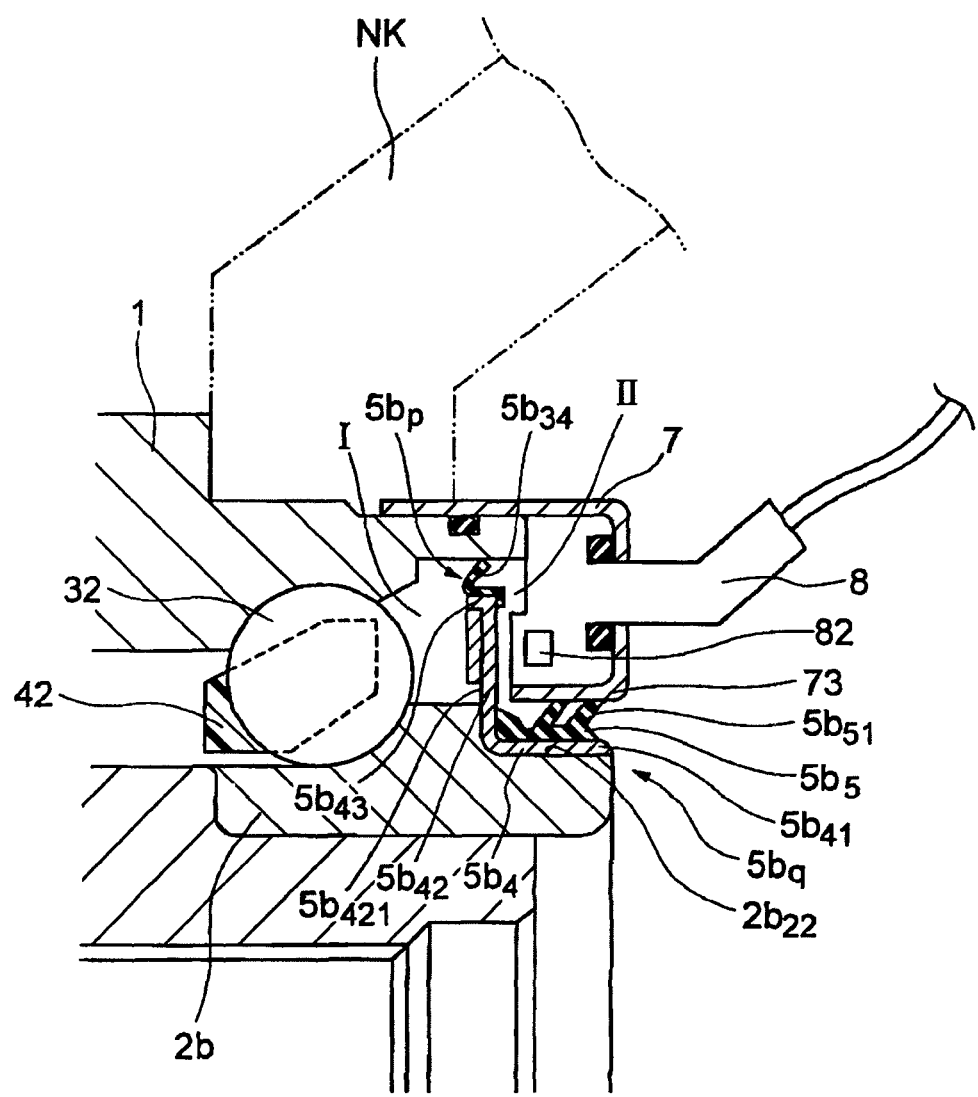
[FIG. 6] A diagram corresponding to FIG. 2, which shows Modified Example 4 of Embodiment 1.

Next, Modified Example 4 will be described by reference to FIG. 6, which corresponds to FIG. 2.

In this modified example, a secondary seal $5bq$ is made up of a metal insert $5b_4$ and an elastic member $5b_5$.

The metal insert $5b_4$ has a cylindrical portion $5b_{41}$ which is fitted on to be fixed to an outer circumferential surface $2b_{22}$ with a reduced diameter of an inner ring element $2b$ and a flange portion $5b_{42}$ which is bent radially outwards from a predetermined position on the cylindrical portion $5b_{41}$ which lies axially inwards in the bearing, and a seal lip $5b_{34}$ is provided on an outer circumferential portion of the flange $5b_{42}$.

The elastic member $5b_5$ is bonded to an outer circumferential surface of the cylindrical portion $5b_{41}$ and has two lips $5b_{51}$, which are brought into sliding contact with an inner circumferential surface of a secondary cylindrical portion 73 of a sensor case 7, so as to form a secondary seal $5bq$.

A seal lib $5b_{34}$ which is provided on an outer circumferential portion of the flange $5b_{42}$ is brought into sliding contact with an inner circumferential surface 1d of an outer ring 1, so as to function as a primary seal $5bp$. An encoder 6 is mounted on an inward side surface $5b_{421}$ of the flange $5b_{42}$ which is oriented inwards into the bearing.

In this modified example, the encoder 6 is disposed within a primary sealed space portion I defined between the primary sealed space portion I and center side facing rolling elements 32, and a detecting portion 82 is disposed in a secondary sealed space portion II defined between the secondary seal $5bq$ and the primary seal $5bp$, whereby a rotational speed detector 9 is configured.

Figure 7:
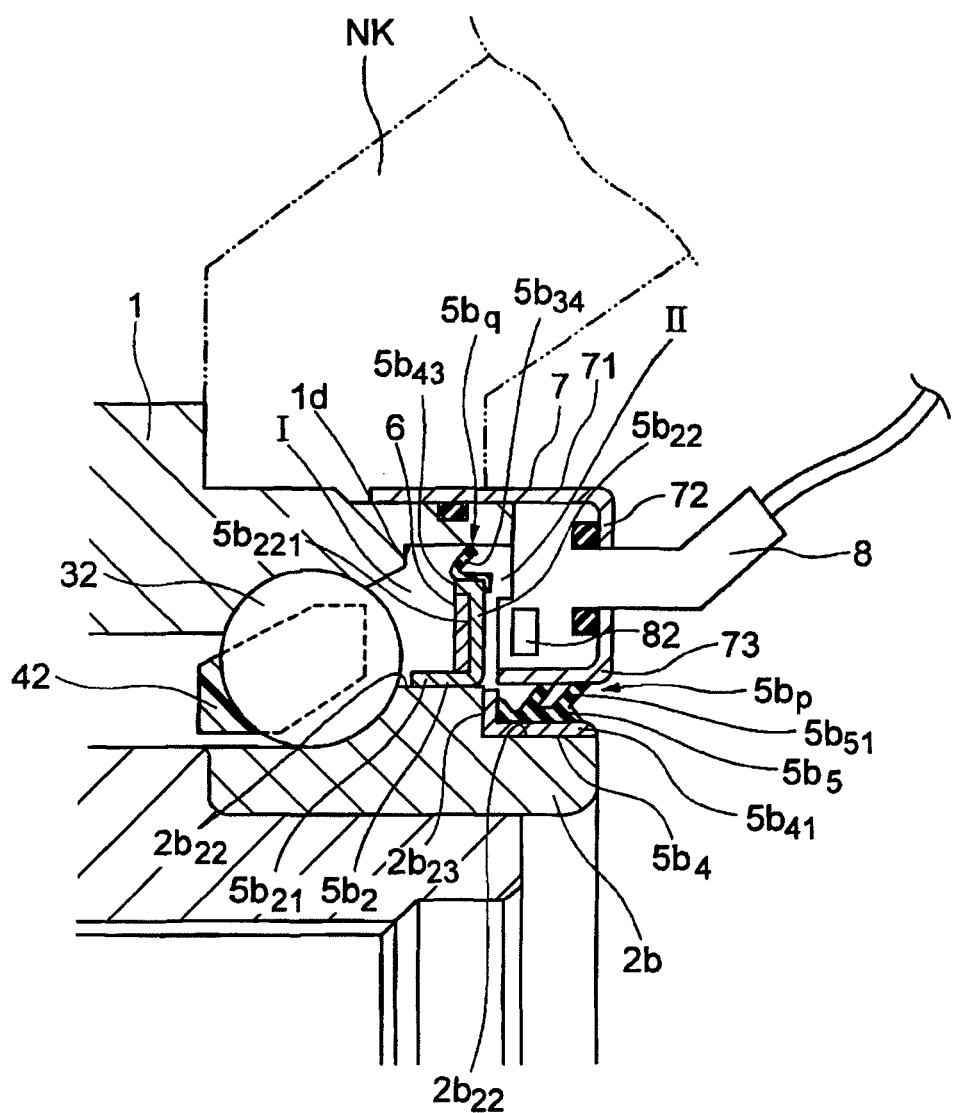
[FIG. 7] A diagram corresponding to FIG. 2, which shows Modified Example 5 of Embodiment 1.

Next, Modified Example 5 will be described by reference to FIG. 7, which corresponds to FIG. 2.

In this modified example, in contrast to Modified Example 4 in which the encoder 6 is mounted on the flange $5b_{42}$ of the metal insert $5b_4$ of the secondary seal $5bq$, an encoder 6 is mounted on a flange $5b_{22}$ of a slinger $5b_2$ which is separate from a metal insert $5b_4$ of a secondary seal $5bq$.

Namely, a primary seal $5bp$ is made up of the slinger $5b_2$ and a seal lip $5b_{34}$ which is vulcanizedly bonded with an outer circumferential portion of the slinger $5b_2$. The slinger $5b_2$ is made up of a cylindrical portion $5b_{21}$ which is fitted on to be fixed to an outer circumferential surface $2b_{22}$ of an inner ring element $2b$ and a flange $5b_{22}$ which is bent radially outwards from a predetermined position on the cylindrical portion $5b_{21}$ which lies axially outwards. An outer circumferential portion of the flange $5b_{22}$ is oriented axially inwards so as to form a cylindrical portion $5b_{43}$, and a seal lip $5b_{34}$ is bonded to the cylindrical portion $5b_{43}$.

A primary seal $5bp$ is formed by the seal lip $5b_{43}$ and an inner circumferential surface 1d.

A magnetic encoder 6 is bonded to an inward side surface $5b_{221}$ of the flange $5b_{22}$.

As with Modified Example 4, the magnetic encoder 6 is disposed within a primary sealed space portion I and a sensor 8 is disposed within a secondary sealed space portion II, whereby a rotational speed detector 9 is configured.

Figure 8:
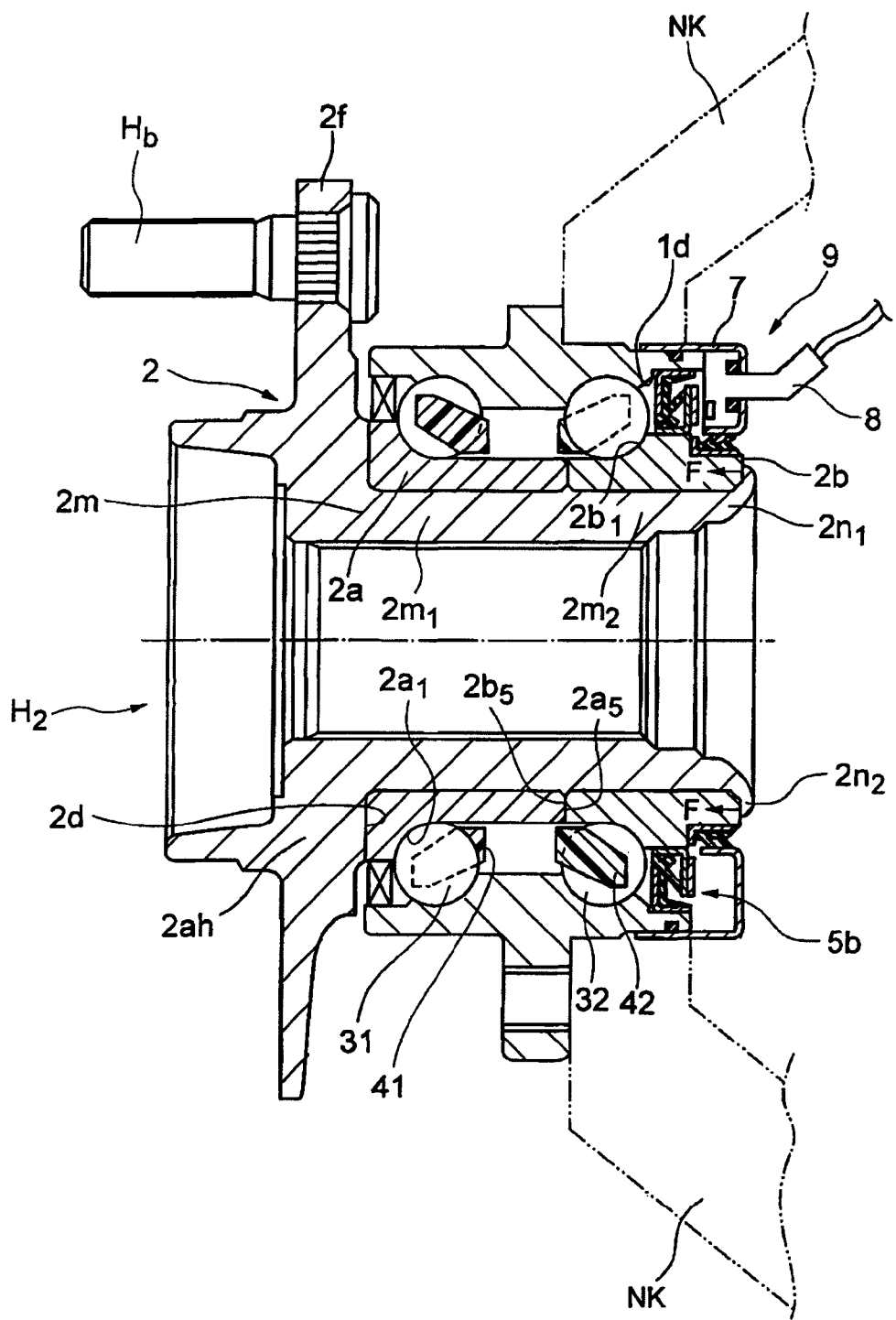
[FIG. 8] A diagram corresponding to FIG. 2, which shows Modified Example 6 of Embodiment 1.

Next, Modified Example 6 will be described by reference to FIG. 8, which corresponds to FIG. 1.

This modified example is such that Embodiment 1 is applied to a hub unit bearing $H_2$, and the hub unit $H_2$ differs from the hub unit $H_1$ in FIG. 1 in the following point.

The hub unit $H_2$ differs from the hub unit $H_1$ in that a primary outer circumferential raceway $2a_1$ is provided separately from a hub shaft $2ah$.

Namely, the hub unit H2 has a hub flange $2f$ on a side thereof which faces an outermost side, and a cylindrical portion $2m$ is formed to extend from the hub flange $2f$ towards a center side. The cylindrical portion $2m$ includes an outermost side facing cylindrical portion $2m_1$ and a center side facing cylindrical portion $2m_2$, and an inner ring 2 is made up of the hub shaft $2ah$ in which an inner ring element $2a$ is fitted on to be fixed to the outermost side facing cylindrical portion $2m_1$ and an inner ring element $2b$ which is provided side by side with the inner ring element $2a$ and is fitted on the center side facing cylindrical portion $2m_2$. The primary outer circumferential raceway $2a_1$ and a secondary outer circumferential raceway $2b_1$ formed on an outer circumferential surface of the inner ring element $2a$ which is separately fitted on the outermost side facing cylindrical portion $2m_1$ and an outer circumferential surface of the inner ring element $2b$ which is fitted on the center side facing cylindrical portion $2m_2$, respectively, and both the raceways are provided indirectly relative to the cylindrical portion $2m$.

A center side facing distal end portion $2n_1$ of the hub shaft $2ah$ is plastically deformed to be expanded diametrically so as to form a crimping portion $2n_2$, whereby a crimping force F is generated so as to fix the inner ring element $2b$ which is fitted on the center side facing cylindrical portion $2m_2$ of the hub shaft $2ah$ which lies to face a center side between a joining portion $2d$ between the outermost side facing cylindrical portion $2m_1$ on which the inner ring element $2a$ is fitted and the hub flange $2f$ and the crimping portion $2n_2$ with respect to the axial direction.

The inner ring element $2a$ and the inner ring element $2b$ are made to abut with each other at respective end portions $2a_5$, $2b_5$ thereof which lie inwards in the bearing. In this modified example, the end portion $2a_5$ of the inner ring element $2a$ represents the portion which corresponds to the outermost side facing cylindrical portion $2m_1$ in Embodiment 1 and elastically fixes the inner ring element $2b$ through compression between the crimping portion $2n_2$ and itself.

The other features of this modified example are the same as those shown in FIG. 1, and the description of like reference numerals and like portions will be omitted here.

Thus, while Embodiment 1 and the modified examples thereto have been described heretofore, since the invention is such that the primary seal $5bp$ and the secondary seal $5bq$ realize the double seal construction so as to provide the primary sealed space portion I between the center side facing balls 32 and the primary seal $5bp$ and the secondary sealed space portion $5pq$ between the primary seal $5bp$ and the secondary seal $5bq$, the sealing durability against the intrusion of foreign matters is increased, and since the rotational speed detector 9 is constructed so as to be mounted on the hub unit bearing for integration therewith, the invention is advantageous in that not only can the control of the dimension of the gap between the encoder 6 and the sensor 8 be facilitated, but also a rotational speed signal inspection can be implemented.

The invention is not limited to the scope which is described by Embodiment 1 and the modified examples thereto but is embodied variously without departing from the concept of the invention.

In Embodiment 1 and the modified examples made thereto, while the invention is described as being applied to the hub unit bearing which employs the balls as rolling elements, the invention can also be applied to a hub unit bearing which employs tapered rollers, cylindrical rollers, or spherical rollers as rolling elements.

This patent application is based on Japanese Patent Application (No. 2007-185980) filed on Jul. 17, 2007, the entire contents of which are incorporated herein by reference.

The invention claimed is:

1. A hub unit bearing comprising:
an outer ring having a primary inner circumferential raceway on a side thereof which faces an outermost side of a vehicle and a secondary inner circumferential raceway on a side thereof which faces a center side of the vehicle;
an inner ring including:
a hub shaft including, on a side thereof which faces the outermost side of the vehicle a hub flange, from which a cylindrical portion extends towards the center side of the vehicle, the cylindrical portion including a primary outer circumferential raceway which faces the primary inner circumferential raceway; and
an inner ring element, fixed to a center side of the cylindrical portion, including a secondary outer circumferential raceway which faces the secondary inner circumferential raceway;
rolling elements interposed between the primary inner circumferential raceway and the primary outer circumferential raceway on a side facing the outermost side of the vehicle;
rolling elements interposed between the secondary inner circumferential raceway and the secondary outer circumferential raceway on a side facing the center side of the vehicle;
an outermost side facing seal provided on the side of the outer ring which faces the outermost side of the vehicle for sealing a space defined between the inner ring and the outer ring and a center side seal provided on the side of the outer ring which faces the center side of the vehicle for sealing the space defined between the outer ring and the inner ring; and
a rotational speed detector made up of an encoder mounted on the side of the inner ring which faces the center side of the vehicle and a sensor held in a sensor case mounted on the outer ring,
wherein the center side seal comprises a primary seal and a secondary seal which are disposed spaced apart from each other in an axial direction from the rolling elements on the side facing the center side of the vehicle towards the center side of the vehicle and has a primary sealed space portion between the rolling elements on the side facing the center side of the vehicle and the primary seal, and a secondary sealed space portion between the primary seal and the secondary seal, and the rotational speed detector is disposed in the secondary sealed space portion,
wherein the secondary seal including at least one seal lip, and the at least one seal lip is brought into sliding contact with an inner circumferential surface of the sensor case mounted on the outer ring so as to form a seal portion,
wherein the secondary seal is separated from the primary seal and the rotational speed detector, and
wherein the secondary seal is fitted on to a stepped portion that has a reduced diameter and is formed on an outer circumferential surface of the inner ring element.

2. The hub unit bearing as set forth in claim 1, wherein the primary seal comprises a metal insert fitted in the outer ring, a primary seal lip vulcanizedly bonded with the metal insert and a slinger fitted on the inner ring and having a flange which is bent radially outwards, and the rotational speed detector is formed by bringing the flange and the primary seal lip into sliding contact with each other to form a seal portion, mounting the encoder on an axially outward side surface of the flange and disposing the sensor so as to face the encoder.

3. The hub unit bearing comprising:
an outer ring having a primary inner circumferential raceway on a side thereof which faces an outermost side of a vehicle and a secondary inner circumferential raceway on a side thereof which faces a center side of the vehicle;
an inner ring including:
a hub shaft including, on a side thereof which faces the outermost side of the vehicle a hub flange, from which a cylindrical portion extends towards the center side of the vehicle, the cylindrical portion including a primary outer circumferential raceway which faces the primary inner circumferential raceway; and
an inner ring element, fixed to a center side of the cylindrical portion, including a secondary outer circumferential raceway which faces the secondary inner circumferential raceway;
rolling elements interposed between the primary inner circumferential raceway and the primary outer circumferential raceway on a side facing the outermost side of the vehicle;
rolling elements interposed between the secondary inner circumferential raceway and the secondary outer circumferential raceway on a side facing the center side of the vehicle;
an outermost side facing seal provided on the side of the outer ring which faces the outermost side of the vehicle for sealing a space defined between the inner ring and the outer ring and a center side seal provided on the side of the outer ring which faces the center side of the vehicle for sealing the space defined between the outer ring and the inner ring; and
a rotational speed detector made up of an encoder mounted on the side of the inner ring which faces the center side of the vehicle and a sensor held in a sensor case mounted on the outer ring,
wherein the center side seal comprises a primary seal and a secondary seal which are disposed spaced apart from each other in an axial direction from the rolling elements on the side facing the center side of the vehicle towards the center side of the vehicle and has a primary sealed space portion between the rolling elements on the side facing the center side of the vehicle and the primary seal and a secondary sealed space portion between the primary seal and the secondary seal, and the rotational speed detector is formed by disposing the encoder and the sensor in the primary sealed space portion and in the secondary sealed space portion, respectively, wherein the secondary seal includes at least one seal lip, and the at least one seal lip is brought into sliding contact with an inner circumferential surface of the sensor case mounted on the outer ring so as to form a seal portion, wherein the secondary seal is separated from the primary seal and the rotational speed detector, and wherein the secondary seal is fitted on to a stepped portion that has a reduced diameter and is formed on an outer circumferential surface of the inner ring element.

\* \* \* \* \*